United States Patent
Otake et al.

(10) Patent No.: US 10,419,232 B2
(45) Date of Patent: Sep. 17, 2019

(54) CONTROL APPARATUS, COMMUNICATION SYSTEM, CONTROL METHOD AND PROGRAM

(71) Applicant: NEC Corporation, Tokyo (JP)

(72) Inventors: Takahiro Otake, Tokyo (JP); Mamio Hokazono, Tokyo (JP); Yasushi Takeda, Tokyo (JP); Takahiro Nakano, Tokyo (JP); Shunji Motomura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/558,078

(22) PCT Filed: Mar. 17, 2016

(86) PCT No.: PCT/JP2016/058442
§ 371 (c)(1),
(2) Date: Sep. 13, 2017

(87) PCT Pub. No.: WO2016/152701
PCT Pub. Date: Sep. 29, 2016

(65) Prior Publication Data
US 2018/0083794 A1    Mar. 22, 2018

(30) Foreign Application Priority Data

Mar. 20, 2015 (JP) ................. 2015-057988

(51) Int. Cl.
*H04L 12/18*    (2006.01)
*H04L 12/46*    (2006.01)
(Continued)

(52) U.S. Cl.
CPC ...... *H04L 12/1886* (2013.01); *H04L 12/1854* (2013.01); *H04L 12/1868* (2013.01);
(Continued)

(58) Field of Classification Search
CPC ............. H04L 12/1886; H04L 12/1868; H04L 12/4675; H04L 12/1854; H04L 41/0668;
(Continued)

(56) References Cited

U.S. PATENT DOCUMENTS 6,363,068 B1    3/2002   Kinoshita
9,584,568 B2    2/2017   Tanabe
(Continued)

FOREIGN PATENT DOCUMENTS

EP    2849397 A1    3/2015
EP    2981035 A1    2/2016
(Continued)

OTHER PUBLICATIONS

Extended European Search Report issued by the European Patent Office for European Application No. 16768604.7 dated Jul. 20, 2018 (10 pages).

(Continued)

*Primary Examiner* — Ajay Cattungal
(74) *Attorney, Agent, or Firm* — Wilmer Cutler Pickering Hale and Dorr LLP

(57) ABSTRACT

A control apparatus comprises a path generation unit configured to logically generate a plurality of forwarding paths for forwarding a broadcast packet between a plurality of domains that each includes a plurality of communication nodes; a path determination unit configured to determine different communication nodes among the plurality of communication nodes included in each domain as representative nodes that forward the broadcast packet in each of the plurality of forwarding paths; and a path setting unit configured to set control information including information regarding the representative nodes in the communication nodes on the plurality of forwarding paths.

18 Claims, 8 Drawing Sheets

(51) Int. Cl.
  *H04L 12/24* (2006.01)
  *H04L 12/715* (2013.01)
  *H04L 12/707* (2013.01)
  *H04L 12/703* (2013.01)
  *H04L 12/761* (2013.01)

(52) U.S. Cl.
  CPC ...... *H04L 12/4675* (2013.01); *H04L 41/0668* (2013.01); *H04L 45/04* (2013.01); *H04L 45/16* (2013.01); *H04L 45/24* (2013.01); *H04L 45/28* (2013.01)

(58) Field of Classification Search
  CPC ......... H04L 45/04; H04L 45/24; H04L 45/28; H04L 45/16
  See application file for complete search history.

(56) References Cited

U.S. PATENT DOCUMENTS

| | | | |
|---|---|---|---|
| 2001/0005369 A1 | 6/2001 | Kloth | |
| 2009/0327985 A1* | 12/2009 | Chen | G06F 17/5031 716/113 |
| 2011/0090791 A1* | 4/2011 | Udupi | H04L 45/04 370/231 |
| 2011/0292832 A1* | 12/2011 | Bottari | H04L 41/0896 370/254 |
| 2012/0030360 A1* | 2/2012 | Sanders | H04L 45/00 709/227 |
| 2012/0195229 A1* | 8/2012 | Chen | H04L 45/12 370/254 |
| 2013/0016605 A1* | 1/2013 | Chen | H04L 45/02 370/221 |
| 2013/0034104 A1* | 2/2013 | Yedavalli | H04L 41/12 370/400 |
| 2013/0104236 A1* | 4/2013 | Ray | H04L 63/1433 726/25 |
| 2013/0139122 A1* | 5/2013 | Pell | G06F 17/505 716/117 |
| 2014/0156751 A1* | 6/2014 | Bardalai | H04L 45/22 709/204 |
| 2014/0205278 A1* | 7/2014 | Kakkar | H04L 45/04 398/5 |
| 2014/0247712 A1* | 9/2014 | Cheung | H04L 41/0663 370/228 |
| 2015/0023207 A1* | 1/2015 | Lan | H04L 43/0894 370/254 |
| 2015/0103824 A1* | 4/2015 | Tanabe | H04L 65/4076 370/390 |
| 2015/0139245 A1 | 5/2015 | Yedavalli et al. | |
| 2015/0341255 A1* | 11/2015 | Lu | H04L 45/16 370/389 |
| 2016/0006684 A1 | 1/2016 | Akiyoshi | |
| 2016/0050081 A1 | 2/2016 | Otake | |
| 2017/0149610 A1 | 5/2017 | Yedavalli et al. | |
| 2017/0337813 A1* | 11/2017 | Taylor | G08G 1/0141 |

FOREIGN PATENT DOCUMENTS

| | | |
|---|---|---|
| JP | H11-008646 A | 1/1999 |
| JP | 2008-219531 A | 9/2008 |
| WO | WO-2013/168737 A1 | 11/2013 |
| WO | WO-2014/132958 A1 | 9/2014 |
| WO | WO-2014/157609 A1 | 10/2014 |

OTHER PUBLICATIONS

International Search Report corresponding to PCT/JP2016/058442, 1 page, dated May 31, 2016.

McKeown, Nick et al. "OpenFlow: Enabling Innovation in Campus Networks," Mar. 14, 2008, 6 pages.

"OpenFlow Switch Specification," Version 1.3.1, (Wire Protocol 0x04), Open Networking Foundation, Sep. 6, 2012, 128 pages.

* cited by examiner

FIG. 5

FLOODING PATH SIDE ID = 1

| SIGN IN DRAWINGS | COMMUNICATION NODE ID | CALCULATION RESULT | REPRESENTATIVE/ NON-REPRESENTATIVE NODE |
|---|---|---|---|
| 210 | 10 | 0 | REPRESENTATIVE |
| 211 | 11 | 0 | NON-REPRESENTATIVE |
| 220 | 20 | 0 | REPRESENTATIVE |
| 221 | 21 | 0 | NON-REPRESENTATIVE |

FLOODING PATH SIDE ID = 2

| SIGN IN DRAWINGS | COMMUNICATION NODE ID | CALCULATION RESULT | REPRESENTATIVE/ NON-REPRESENTATIVE NODE |
|---|---|---|---|
| 210 | 10 | 0 | NON-REPRESENTATIVE |
| 211 | 11 | 1 | REPRESENTATIVE |
| 220 | 20 | 0 | NON-REPRESENTATIVE |
| 221 | 21 | 1 | REPRESENTATIVE |

CONTROL APPARATUS, COMMUNICATION SYSTEM, CONTROL METHOD AND PROGRAM

TECHNICAL FIELD

REFERENCE TO RELATED APPLICATION

This application is a national stage application of International Application No. PCT/JP2016/058442 entitled "CONTROL APPARATUS, COMMUNICATION SYSTEM, CONTROL METHOD AND PROGRAM," filed on Mar. 17, 2106, which claims the benefit of the priority of Japanese Patent Application No. 2015-057988 filed on Mar. 20, 2015, the disclosures of each of which are hereby incorporated by reference in their entirety. The present invention relates to a control apparatus, communication system, control method and program, and particularly to a control apparatus, communication system, control method and program in a centralized control network.

BACKGROUND

Non-Patent Literature 1 describes a technology called OpenFlow. In OpenFlow, dynamic, centralized control of a network is realized by a communication node (forwarding node) called OpenFlow Switch that forwards packets and OpenFlow Controller that controls communication paths in the network by controlling packet forwarding by the communication node.

Further, Non-Patent Literature 2 describes the required specification of the OpenFlow Switch.

Further, Patent Literature 1 describes a technology that selects a representative port exchanging broadcast packets with an adjacent domain for each of a plurality of domains comprised of a plurality of communication nodes provided in a network, calculates a forwarding path, and forward the broadcast packet along the forwarding path. According to this technology, the load on a controller can be reduced.

Further, Patent Literature 2 describes a technology that sends a transmitted packet to a single specific port out of a plurality of ports in a bridge comprising the plurality of ports in a case where the transmitted packet is a broadcast packet.

Further, Patent Literature 3 describes a technology using a VLAN-ID (Virtual Local Area Network Identifier) as a broadcast domain.

[Patent Literature 1]
International Publication Number WO2014/157609
[Patent Literature 2]
Japanese Patent Kokai Publication No. JP-A-11-008646
[Patent Literature 3]
Japanese Patent Kokai Publication No. JP-P2008-219531A
[Non-Patent Literature 1]
Nick McKeown, et al. "OpenFlow: Enabling Innovation in Campus Networks," [online], [searched on Feb. 13, 2015], the Internet <URL: http://archive.openflow.org/documents/openflow-wp-latest.pdf>
[Non-Patent Literature 2]
"OpenFlow Switch Specification" Version 1.3.1 (Wire Protocol 0x04), [online], [searched on Feb. 13, 2015], the Internet <URL: https://www.opennetworking.org/images/stories/downloads/sdn-resources/onf-specifications/openflow/openflow-spec-v1.3.1.pdf>

SUMMARY

The disclosures of Patent Literatures 1 to 3 and Non-Patent Literatures 1 and 2 cited above are incorporated herein in their entirety by reference thereto. The following analysis is given by the present inventor.

In the control method described in Patent Literature 1, a plurality of logical domains are constituted using a plurality of communication nodes in a centralized control network using a controller, a representative node/port that exchanges broadcast packets with an adjacent domain is selected, and a forwarding path of a broadcast packet via the representative node/port is calculated for each domain.

According to this method, only one representative node/port is selected for each pair of adjacent domains. Then, all broadcast packets across domains pass through only selected ports, putting a strain on the communication bandwidth.

Further, since the technology described in Patent Literature 2 assigns a broadcast packet to a single specific port out of a plurality of ports, this may also put a strain on the communication bandwidth when a broadcast packet is forwarded as in Patent Literature 1.

The technology described in Patent Literature 3 discloses that a user frame is broadcast in networks belonging to the same VLAN (Virtual Local Area Network) and does not solve the above problem.

Further, neither Patent Literature 2 nor 3 relates to a technology that constitutes a plurality of logical domains using a plurality of communication nodes (forwarding nodes).

Therefore, the problem is to reduce strain on the bandwidth when a broadcast packet is forwarded via representative nodes between domains constituted by a plurality of communication nodes. It is an object of the present invention to provide a control apparatus, communication system, control method and program that contribute to solving this problem.

A control apparatus relating to a first aspect of the present invention comprises a path generation unit configured to logically generate a plurality of forwarding paths for forwarding a broadcast packet between a plurality of domains that each includes a plurality of communication nodes; a path determination unit configured to determine different communication nodes among the plurality of communication nodes included in each domain as representative nodes that forward the broadcast packet in each of the plurality of forwarding paths; and a path setting unit configured to set control information including information regarding the representative nodes in the communication nodes on the plurality of forwarding paths.

A communication system relating to a second aspect of the present invention comprises a plurality of communication nodes divided into a plurality of domains that each includes a plurality of communication nodes, and a control apparatus configured to control the plurality of communication nodes; and the control apparatus comprises a path generation unit configured to logically generate a plurality of forwarding paths for forwarding a broadcast packet between the plurality of domains, a path determination unit configured to determine different communication nodes among the plurality of communication nodes included in each domain as representative nodes that forward the broadcast packet in each of the plurality of forwarding paths, and a path setting unit configured to set control information including information regarding the representative nodes in the communication nodes on the plurality of forwarding paths.

A control method performed in a control apparatus relating to a third aspect of the present invention includes logically generating a plurality of forwarding paths for forwarding a broadcast packet between a plurality of domains that each includes a plurality of communication nodes; determining different communication nodes among the plurality of communication nodes included in each domain as representative nodes that forward the broadcast packet in each of the plurality of forwarding paths; and setting control information including information regarding the representative nodes in the communication nodes on the plurality of forwarding paths.

A program relating to a fourth aspect of the present invention has a computer execute a process of logically generating a plurality of forwarding paths for forwarding a broadcast packet between a plurality of domains that each includes a plurality of communication nodes; a process of determining different communication nodes among the plurality of communication nodes included in each domain as representative nodes that forward the broadcast packet in each of the plurality of forwarding paths; and a process of setting control information including information regarding the representative nodes in the communication nodes on the plurality of forwarding paths. Further, this program may be provided as a program product stored in a non-transitory computer-readable storage medium.

According to the control apparatus, communication system, control method and the program relating to the present invention, it becomes possible to reduce strain on the bandwidth when a broadcast packet is forwarded via representative nodes between domains including a plurality of communication nodes.

BRIEF DESCRIPTION OF THE DRAWINGS

FIG. 5 is a drawing for explaining the operation of determining a representative node and non-representative node of an MC-LAG by the control apparatus relating to the first exemplary embodiment.

PREFERRED MODES

Figure 1:
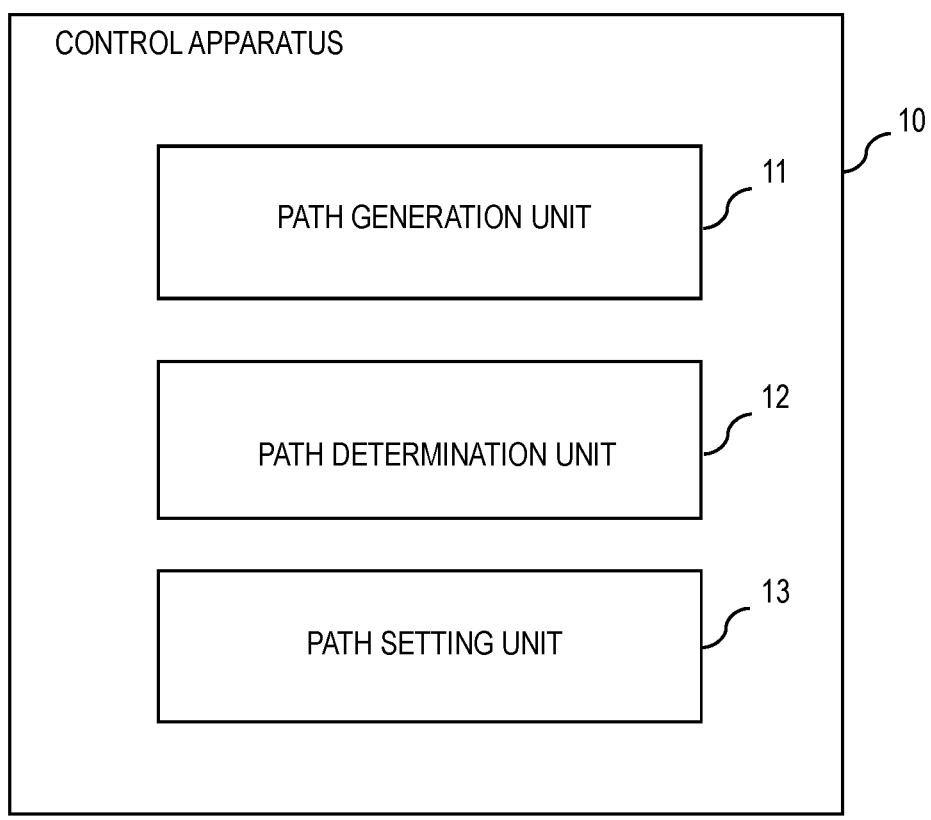
FIG. 1 is a block diagram illustrating the configuration of a control apparatus relating to an exemplary embodiment.

First, a outline of an exemplary embodiment will be given. Note that drawing reference signs in the outline are given solely to facilitate understanding and are not intended to limit the present invention to the modes shown in the drawings.

Figure 2:
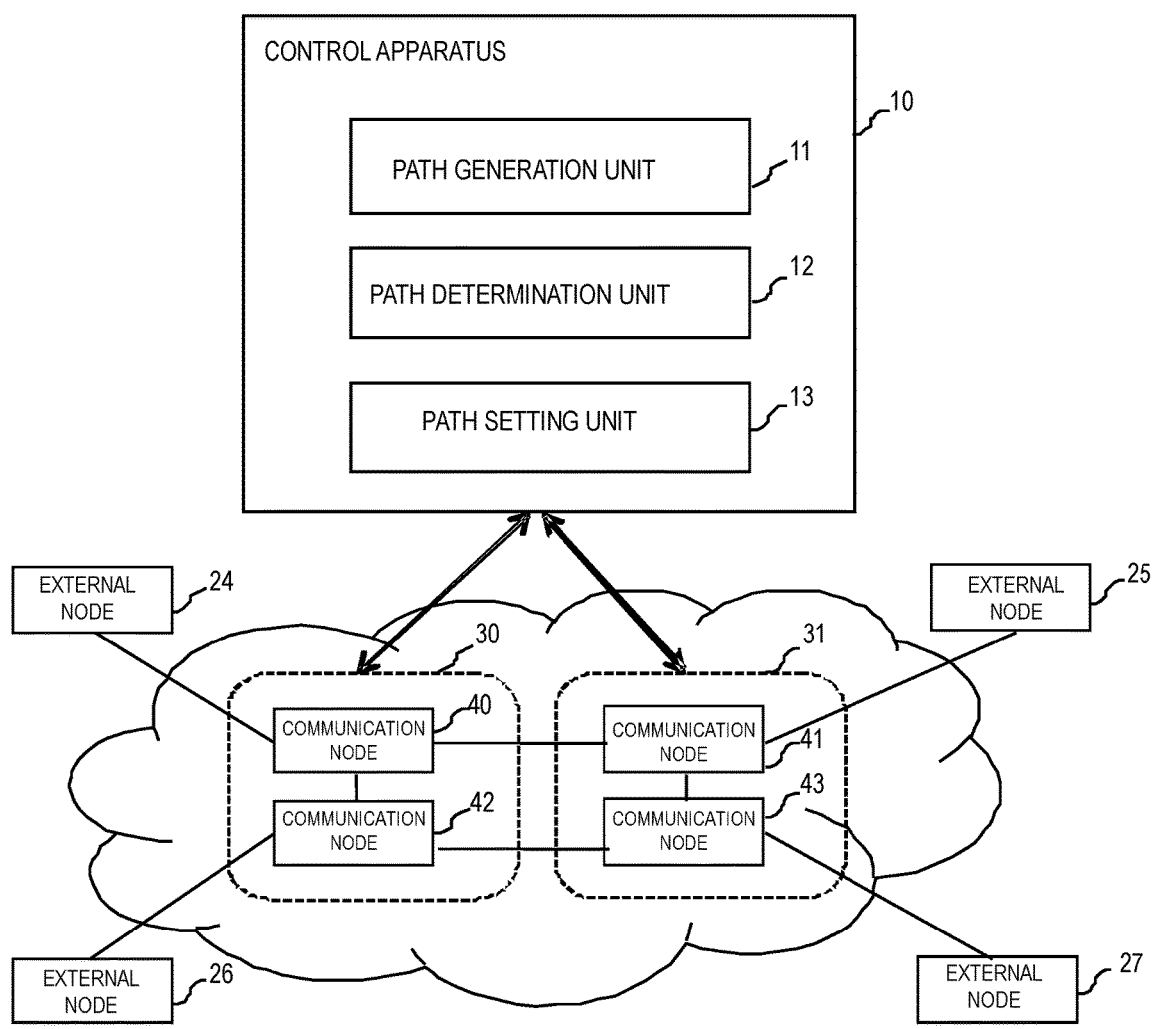
FIG. 2 is a block diagram illustrating the configuration of a communication system comprising the control apparatus relating to an exemplary embodiment.

FIG. 1 is a block diagram illustrating the configuration of a control apparatus 10 relating to an exemplary embodiment. FIG. 2 is a block diagram illustrating the configuration of a communication system comprising the control apparatus 10 relating to an exemplary embodiment.

In FIG. 1, the control apparatus 10 comprises a path generation unit 11 that is configured to logically generate a plurality of forwarding paths for forwarding a broadcast packet between a plurality of domains that each includes a plurality of communication nodes (for instance a domain 30 having communication nodes 40 and 42 and a domain 31 having communication nodes 41 and 43 in FIG. 2); a path determination unit 12 that is configured to determine different communication nodes among the plurality of communication nodes included in each domain as representative nodes that forward the broadcast packet in each of the plurality of forwarding paths (for instance determining the communication nodes 40 and 41 to be the representative nodes in a first forwarding path and the communication nodes 42 and 43 to be the representative nodes in a second forwarding path); and a path setting unit 13 that is configured to set control information including information regarding the representative nodes in the communication nodes on the plurality of forwarding paths.

A more detailed description will be given with reference to FIG. 2. The communication system shown in FIG. 2 comprises the control apparatus 10 that controls a centralized control network and the communication nodes 40 to 43 that forward packets according to control information set by the control apparatus 10.

The path generation unit 11 logically generates broadcast packet forwarding paths linked to a VLAN (Virtual Local Area Network) for each of the domains 30 and 31 constituted using the communication nodes 40 to 43 provided in the network to be controlled. The path determination unit 12 selects a representative node/port for exchanging broadcast packets with an adjacent domain for each of the plurality of domains in the broadcast packet forwarding paths, and calculates a broadcast packet forwarding path. The path setting unit 13 sets the control information for having a packet forwarded to communication nodes on the broadcast packet forwarding path.

In other words, in the control apparatus 10, the path generation unit 11 logically generates a plurality of broadcast packet forwarding paths linked to the VLAN for each of the domains 30 and 31, and the path determination unit 12 determines the representative node/port for packet communication between the domains 30 and 31 for each broadcast packet forwarding path.

According to this configuration, a plurality of communication paths for broadcast packets can be provided so that communication paths for broadcast packets are not concentrated on particular communication nodes and strain on the communication bandwidth when a broadcast packet is forwarded can be reduced.

<Exemplary Embodiment 1>

Figure 3:
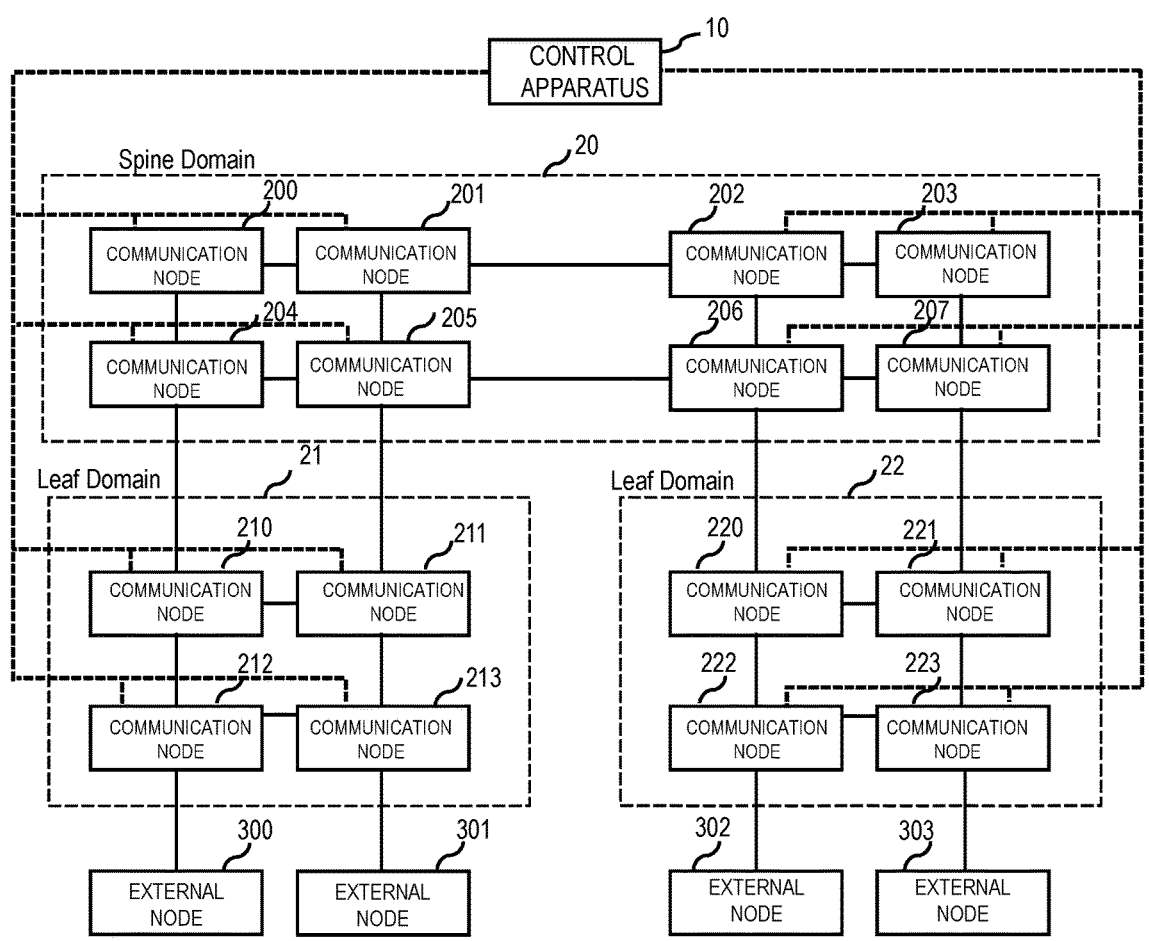
FIG. 3 is a block diagram illustrating the configuration of a communication system comprising a control apparatus relating to a first exemplary embodiment.

Next, a control apparatus relating to a first exemplary embodiment of the present invention will be described in detail with reference to the drawings. FIG. 3 is a drawing illustrating the configuration of a communication system comprising the control apparatus 10 of the present exemplary embodiment.

In FIG. 3, the communication system has a configuration in which communication nodes 200 to 207, 210 to 213, and 220 to 223 (abbreviated as the "communication nodes 200 to 223" hereinafter) that perform packet communication according to control information set by the control apparatus 10, external nodes 300 to 303 that perform packet communication via the communication nodes 200 to 223, and the control apparatus 10 that controls the communication nodes 200 to 223 are connected.

In FIG. 3, dashed lines from the control apparatus 10 to each of the communication nodes 200 to 223 indicate channels for control information communication.

The control apparatus 10 manages packet communication among the external nodes 300 to 303, deciding which communication nodes each path goes through.

The communication nodes 200 to 207 belong to a logical domain 20 (Spine domain). Meanwhile, the communication nodes 210 to 213 belong to a logical domain 21 (Leaf domain). Further, the communication nodes 220 to 223 belong to a logical domain 22 (Leaf domain).

The Spine domain 20 is higher than the Leaf domains 21 and 22. Packet communication across the Leaf domains 21 and 22 always goes through the Spine domain 20.

The communication node 200 is connected to the communication nodes 201 and 204 by data communication channels (solid lines).

The communication node 201 is connected to the communication nodes 200, 202, and 205 by data communication channels (solid lines).

The communication node 202 is connected to the communication nodes 201, 203, and 206 by data communication channels (solid lines).

The communication node 203 is connected to the communication nodes 202 and 207 by data communication channels (solid lines).

The communication node 204 is connected to the communication nodes 200, 205, and 210 by data communication channels (solid lines).

The communication node 205 is connected to the communication nodes 201, 204, 206, and 211 by data communication channels (solid lines).

The communication node 206 is connected to the communication nodes 202, 205, 207, and 220 by data communication channels (solid lines).

The communication node 207 is connected to the communication nodes 203, 206, and 221 by data communication channels (solid lines).

The communication node 210 is connected to the communication nodes 204, 211, and 212 by data communication channels (solid lines).

The communication node 211 is connected to the communication nodes 205, 210, and 213 by data communication channels (solid lines).

The communication node 212 is connected to the communication nodes 210 and 213 and the external node 300 by data communication channels (solid lines).

The communication node 213 is connected to the communication nodes 211 and 212 and the external node 301 by data communication channels (solid lines).

The communication node 220 is connected to the communication nodes 206, 221, and 222 by data communication channels (solid lines).

The communication node 221 is connected to the communication nodes 207, 220, and 223 by data communication channels (solid lines).

The communication node 222 is connected to the communication nodes 220 and 223 and the external node 302 by data communication channels (solid lines).

The communication node 223 is connected to the communication nodes 221 and 222 and the external node 303 by data communication channels (solid lines).

The external node 300 is connected to the communication node 212 by a data communication channel (a solid line).

The external node 301 is connected to the communication node 213 by a data communication channel (a solid line).

The external node 302 is connected to the communication node 222 by a data communication channel (a solid line).

The external node 303 is connected to the communication node 223 by a data communication channel (a solid line).

Further, the OpenFlow Switches described in Non-Patent Literatures 1 and 2 may be used as the communication nodes 200 to 223 without being limited thereto.

Figure 4:
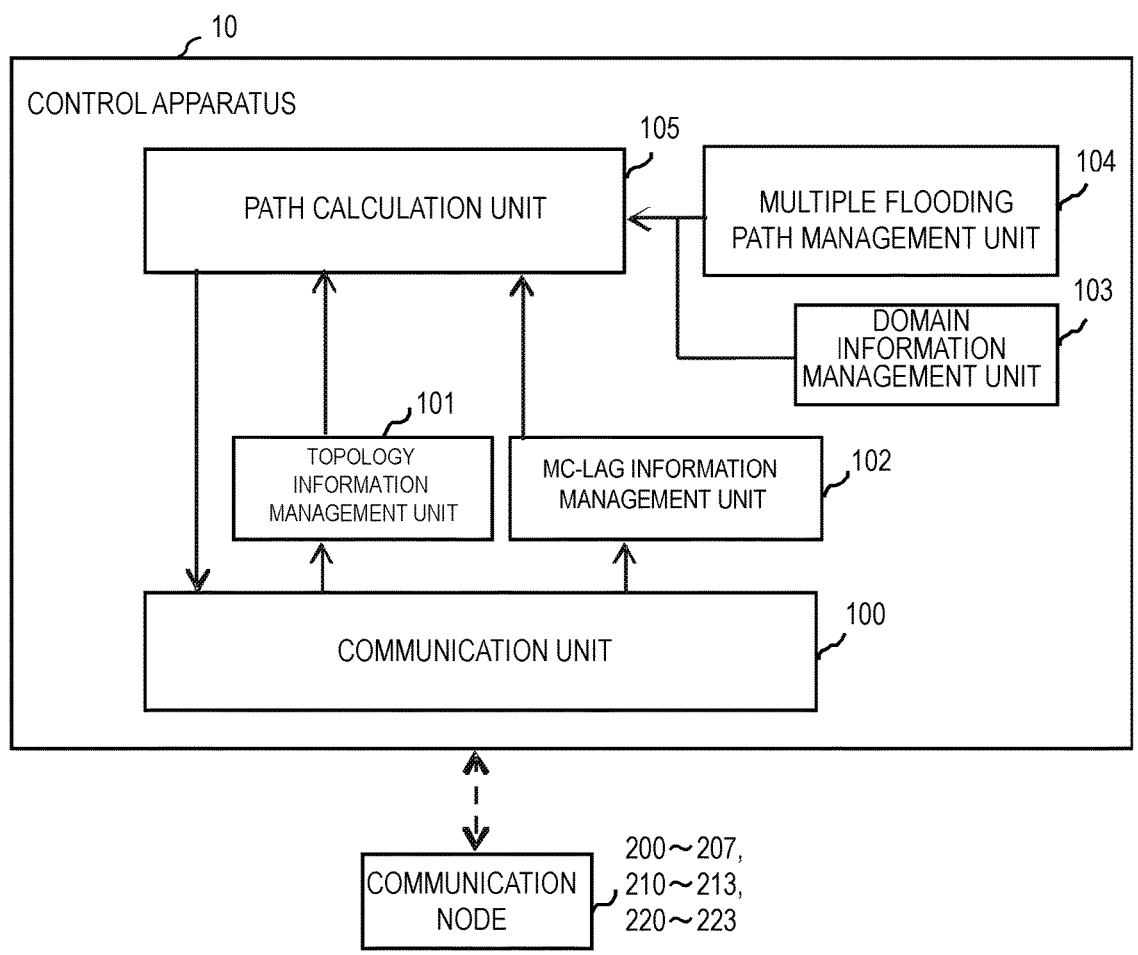
FIG. 4 is a block diagram illustrating the configuration of the control apparatus relating to the first exemplary embodiment.

FIG. 4 is a block diagram illustrating the configuration of the control apparatus 10. In FIG. 4, the control apparatus 10 comprises a communication unit 100, a topology information management unit 101, an MC-LAG (Multi-Chassis Link-Aggregation Group) information management unit 102, a domain information management unit 103, a multiple flooding path management unit 104, and a path calculation unit 105.

The communication unit 100 performs communication for controlling the communication nodes 200 to 223. The communication unit 100 establishes a control session with the communication nodes 200 to 223 and transmits/receives a control message. For instance, the communication unit 100 may use the control messages of the OpenFlow protocol described in Non-Patent Literatures 1 and 2 as the control message. Further, the communication unit 100 may perform communication using a CLI (Command Line Interface) via Telnet or SNMP (Simple Network Management Protocol).

The topology information management unit 101 acquires connection information (topology information) regarding the data communication channels among the communication nodes 200 to 223 from the communication unit 100 and manages the acquired information.

The MC-LAG information management unit 102 acquires information regarding a redundant configuration of communication nodes among the communication nodes 200 to 223 (it is assumed that a redundant configuration based on MC-LAG is used as an example) from the communication unit 100 and manages the acquired information. Specifically, the MC-LAG information management unit 102 acquires the information regarding the communication node redundant configuration from the data communication channels and stores the acquired information. Here, MC-LAG is a link aggregation across a plurality of the communication nodes and a method for increasing redundancy of links and communication nodes by constituting a link aggregation with a plurality of (for instance two) communication nodes.

The domain information management unit 103 manages the relationship between a domain and the communication nodes belonging to the domain. Specifically, the domain information management unit 103 accepts an entry of information of the domain to which a communication node belongs through a character user interface (CUI) or graphical user interface (GUI) and stores the accepted information. As an example of a domain configuration information entry method, the domain to which each communication node belongs may be directly entered.

The multiple flooding path management unit 104 manages a plurality of broadcast packet forwarding paths logically generated linked to a VLAN for each domain. Specifically, the multiple flooding path management unit 14 accepts information of logical broadcast packet forwarding path sides (referred to as "flooding path sides" hereinafter) linked to the VLAN for each domain through a CUI or GUI and stores the accepted information. As an example of a flooding path side information entry method, a unique ID may be given to each flooding path side for each domain, associating VLAN information with this ID.

The path calculation unit 105 determines a representative node/port and/or non-representative node/port of MC-LAG for each broadcast packet forwarding path on the basis of the topology information and MC-LAG information and performs path calculation. The path calculation unit 105 calculates a spanning tree path for each flooding path side through which a packet can be sent from a communication node connected to an external node to at least all the other communication nodes connected to the external nodes in the same domain. The path calculation unit 105 determines the representative node and non-representative node of MC-LAG in this calculation and excludes the non-representative node from the calculation.

As a method for determining the representative node and non-representative node of MC-LAG, the path calculation unit 105 may use the following formula and determine the communication node having the largest value to be the representative node and other communication nodes to be non-representative nodes.

"Communication Node ID" Mod "Flooding Path Side ID"

Here, for instance the communication node ID is in the format of four digits, a hyphen, and a 19 digit hexadecimal string, and calculated as an integer, excluding the hyphen. Further, "mod" in the formula above denotes a modulo operation.

This makes it possible to avoid overlapping of representative nodes and non-representative nodes between different flooding path sides as much as possible. Note that, when the formula above calculates the same result for two communication nodes, for instance the path calculation unit 105 determines the communication node having a smaller communication node ID to be a representative node.

The path calculation unit 105 may employ a method based on minimum spanning tree (for instance Prim's algorithm or Kruskal's algorithm) as the path calculation method.

The multiple flooding path management unit 104, the path calculation unit 105, and the communication unit 100 in the control apparatus 10 of the present exemplary embodiment corresponds to the path generation unit 11, the path determination unit 12, and the path setting unit 13 in the control apparatus of an exemplary embodiment (FIGS. 1 and 2), respectively.

Next, the operation of the communication system comprising the control apparatus 10 relating to the present exemplary embodiment will be described in detail with reference to the drawings.

First, an operation in which a broadcast packet transmitted by the external node 300 connected to the communication node 212 in the Leaf domain 21 is broadcast through a flooding path side in the domains 20, 21, and 22 will be described.

First, flooding path sides (ID=1 (linked to VLAN=10), ID=2 (linked to VLAN=20)) are set through a CUI or GUI, and the multiple flooding path management unit 104 stores the information of the flooding path sides.

Next, as shown in FIG. 5, the path calculation unit 105 calculates flooding paths for the flooding path sides of ID=1 and ID=2 stored in the multiple flooding path management unit 104.

The communication nodes 210 and 211 in the Leaf domain 21 and the communication nodes 220 and 221 in the Leaf domain 22 separately constitute an MC-LAG. Therefore, the path calculation unit 105 determines representative nodes and non-representative nodes in the flooding path sides of ID=1 and ID=2.

First, the path calculation unit 105 determines the representative node and non-representative node in the flooding path side of ID=1 in the MC-LAG of the communication nodes 210 and 211. The communication node ID of the communication node 210 is 10. The path calculation unit 105 calculates the formula above for the flooding path side of ID=1 and obtains 0 as the calculation result. Meanwhile, the communication node ID of the communication node 211 is 11. The path calculation unit 105 calculates the formula above for the flooding path side of ID=1 and obtains 0 as the calculation result. Since the calculation results for the communication nodes 210 and 211 are both 0, the communication node having a smaller communication node ID value takes precedence, and the path calculation unit 105 determines the communication node 210 to be the representative node and the communication node 211 the non-representative node.

Next, the path calculation unit 105 determines the representative node and non-representative node in the flooding path side of ID=2 in the MC-LAG of the communication nodes 210 and 211. The communication node ID of the communication node 210 is 10. The path calculation unit 105 calculates the formula above for the flooding path side of ID=2 and obtains 0 as the calculation result. Meanwhile, the communication node ID of the communication node 211 is 11. The path calculation unit 105 calculates the formula above for the flooding path side of ID=2 and obtains 1 as the calculation result. Since the calculation results for the communication node 211 is greater than that for the communication node 210, the path calculation unit 105 determines the communication node 211 to be the representative node and the communication node 210 the non-representative node.

Next, the path calculation unit 105 determines the representative node and non-representative node in the flooding path side of ID=1 in the MC-LAG of the communication nodes 220 and 221. The communication node ID of the communication node 220 is 20. The path calculation unit 105 calculates the formula above for the flooding path side of ID=1 and obtains 0 as the calculation result. Meanwhile, the communication node ID of the communication node 221 is 21. The path calculation unit 105 calculates the formula above for the flooding path side of ID=1 and obtains 0 as the calculation result. Since the calculation results for the communication nodes 220 and 221 are both 0, the communication node having a smaller communication node ID value takes precedence, and the path calculation unit 105 determines the communication node 220 to be the representative node and the communication node 221 the non-representative node.

Next, the path calculation unit 105 determines the representative node and non-representative node in the flooding path side of ID=2 in the MC-LAG of the communication nodes 220 and 221. The communication node ID of the communication node 220 is 20. The path calculation unit 105 calculates the formula above for the flooding path side of ID=2 and obtains 0 as the calculation result. Meanwhile, the communication node ID of the communication node 221 is 21. The path calculation unit 105 calculates the formula above for the flooding path side of ID=2 and obtains 1 as the calculation result. Since the calculation results for the communication node 221 is greater than that for the communication node 220, the path calculation unit 105 determines the communication node 221 to be the representative node and the communication node 220 the non-representative node.

Figure 6:
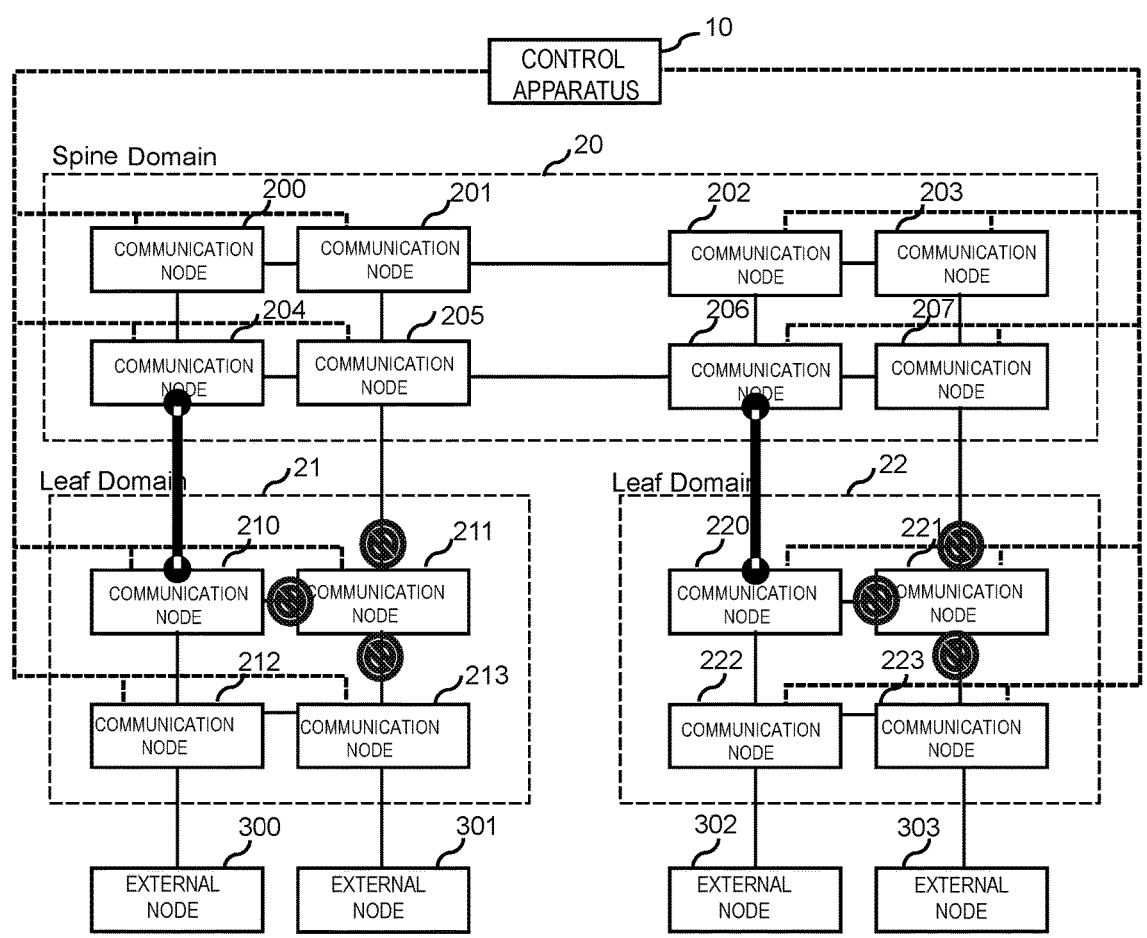
FIG. 6 is a drawing for explaining the forwarding of a broadcast packet in a flooding path side of ID=1 (VLAN=10) by the communication system comprising the control apparatus relating to the first exemplary embodiment.

FIG. 6 is a drawing for explaining the operation of forwarding a broadcast packet in the flooding path side of ID=1 (VLAN=10).

In FIG. 6, a broadcast packet (VLAN=10) transmitted by the external node 300 connected to the communication node 212 in the Leaf domain 21 is sent to the communication node 212 in the Leaf domain 21 and the packet is forwarded from the communication node 212 along the flooding path.

Since the communication node 211 is a non-representative node, it is blocked from sending/receiving a packet. Meanwhile, the communication node 210, a representative node, transmits the packet to the communication node 204 in the Spine domain 20. The transmitted packet is forwarded along the flooding path in the Spine domain 20.

The communication node 206 in the Spine domain 20 is connected to the representative node 220 of the MC-LAG in the Leaf domain 22 and transmits the packet to the communication node 220.

The packet transmitted to the communication node 220 in the Leaf domain 22 is forwarded along the flooding path in the Leaf domain 22.

The packet of VLAN=10 is transmitted to the external nodes 302 and 303 connected to the communication nodes 222 and 223 in the Leaf domain 22 as necessary.

Figure 7:
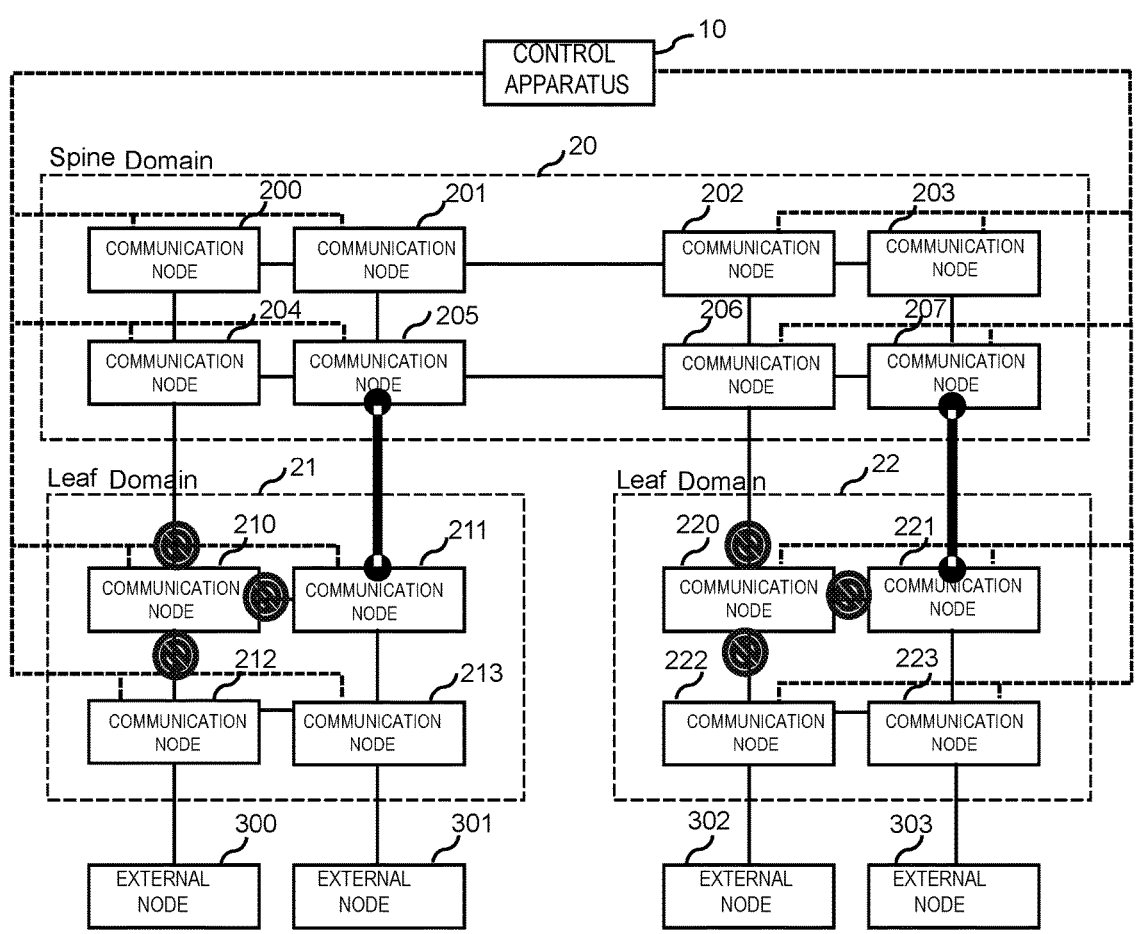
FIG. 7 is a drawing for explaining the forwarding of a broadcast packet in a flooding path side of ID=2 (VLAN=20) by the communication system comprising the control apparatus relating to the first exemplary embodiment.

FIG. 7 is a drawing for explaining the operation of forwarding a broadcast packet in the flooding path side of ID=2 (VLAN=20).

In FIG. 7, a broadcast packet (VLAN=20) transmitted by the external node 300 connected to the communication node 212 in the Leaf domain 21 is sent to the communication node 212 in the Leaf domain 21 and the packet is forwarded from the communication node 212 along the flooding path.

Since the communication node 210 is a non-representative node, it is blocked from sending/receiving a packet. Meanwhile, the communication node 211, a representative node, transmits the packet to the communication node 205 in the Spine domain 20. The transmitted packet is forwarded along the flooding path in the Spine domain 20.

The communication node 207 in the Spine domain 20 is connected to the representative node 221 of the MC-LAG in the Leaf domain 22 and transmits the packet to the communication node 221.

The packet transmitted to the communication node 221 in the Leaf domain 22 is forwarded along the broadcast packet path in the Leaf domain 22.

The packet of VLAN=20 is transmitted to the external nodes 302 and 303 connected to the communication nodes 222 and 223 in the Leaf domain 22 as necessary.

As described above, the control apparatus 10 of the present exemplary embodiment logically generates a plurality of broadcast packet forwarding paths linked to a VLAN for each of the domains 21 and 22 and determines a representative node/port for packet communication between the domains 21 and 22 for each broadcast packet forwarding path. A concentration on a particular communication node/port in each communication path can be avoided by providing a plurality of broadcast packet communication paths. As a result, according to the control apparatus 10 of the present exemplary embodiment, strain on the communication bandwidth in broadcast packet transmission in a centralized control network can be reduced.

<Exemplary Embodiment 2>

Next, a control apparatus 10 relating to a second exemplary embodiment will be described with reference to the drawings. The configuration of the control apparatus 10 of the present exemplary embodiment is the same as that of the control apparatus 10 of the first exemplary embodiment (FIG. 4), except that the control apparatus 10 of the present exemplary embodiment selects an alternate path when a failure occurs in the representative node.

Figure 8:
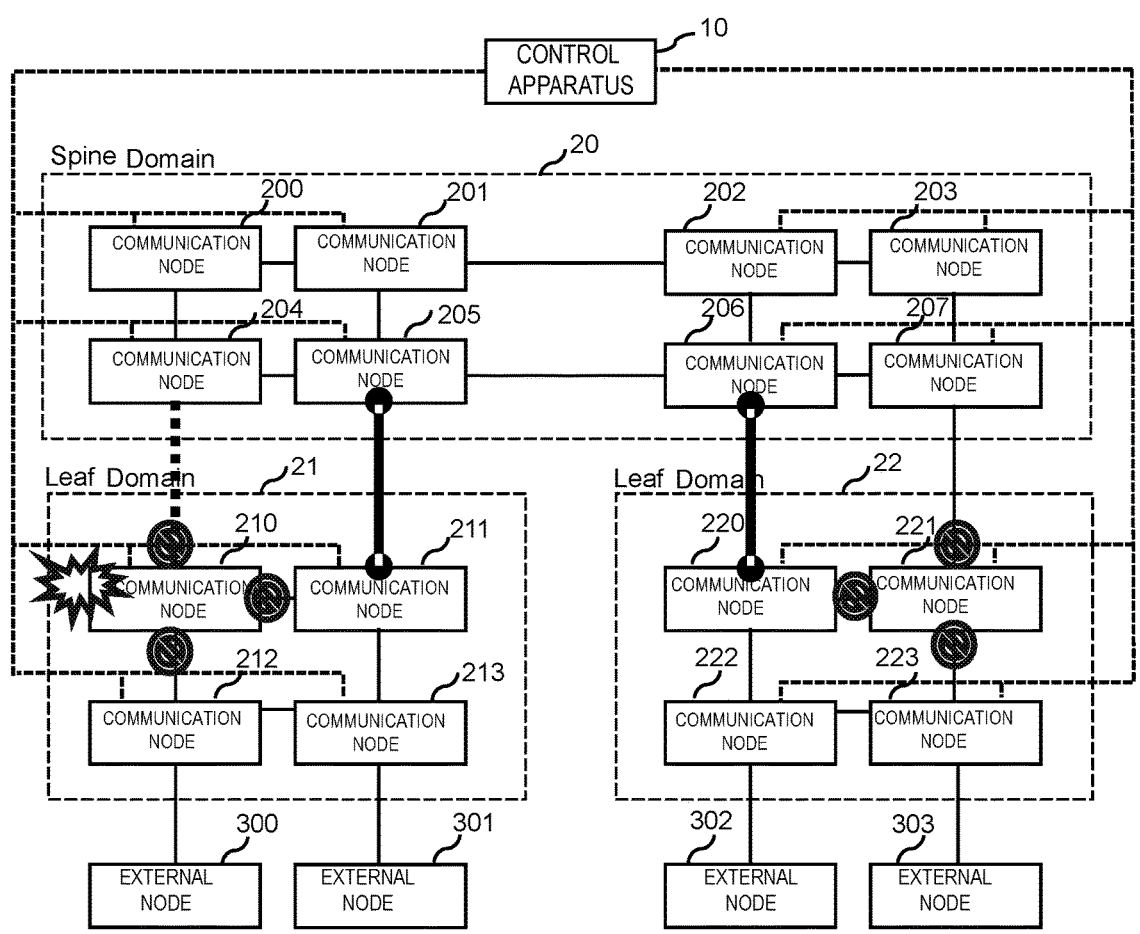
FIG. 8 is a drawing for explaining the forwarding of a broadcast packet in a flooding path side of ID=1 (VLAN=10) by a communication system comprising a control apparatus relating to a second exemplary embodiment.

FIG. 8 is a drawing showing the configuration of a communication system comprising the control apparatus 10 of the present exemplary embodiment. The basic network configuration is identical to the first exemplary embodiment.

Here, it is assumed that, as a result of flooding path calculation by the control apparatus 10, the communication node 210 in the Leaf domain 21 is determined to be the representative node in the flooding path side of ID=1 as in the first exemplary embodiment. Further, for instance, let's assume a case where a failure occurs in the communication node 210, which is now unable to send or receive a packet.

The path calculation unit 105 acquires information regarding the failure of the communication node 210 from the topology information management unit 101, and selects the communication node 211, determined to be the non-representative node regarding the flooding path side of ID=1, as the representative node replacing the communication node 210. Further, the path calculation unit 105 recalculates a flooding path in the flooding path side of ID=1 with the communication node 211 as the representative node.

Meanwhile, since the communication node 210 is the non-representative node in the flooding path side of ID=2, the communication node 211 remains to be the representative node. Therefore, the path calculation unit 105 does not recalculate a flooding path in the flooding path side of ID=2.

Further, no failure has occurred in the MC-LAG in the Leaf domain 22. Therefore, the flooding paths for the flooding path sides of ID=1 and ID=2 in the Leaf domain 22 are maintained.

Next, the operation of broadcasting a broadcast packet transmitted by the external node 300 connected to the communication node 212 in the Leaf domain 21 through the flooding path sides in the domains 20, 21, and 22 in the present exemplary embodiment will be described.

FIG. 8 is a drawing for explaining the forwarding operation of a broadcast packet in the flooding path side of ID=1 (VLAN=10).

In FIG. 8, a broadcast packet (VLAN=10) transmitted by the external node 300 connected to the communication node 212 in the Leaf domain 21 is sent to the communication node 212 in the Leaf domain 21 and the packet is forwarded from the communication node 212 along the flooding path.

Since the communication node 210 is a non-representative node, it is blocked from sending/receiving a packet. Meanwhile, the communication node 211, a representative node, transmits the packet to the communication node 205 in the Spine domain 20. The transmitted packet is forwarded along the flooding path in the Spine domain 20.

The communication node 206 in the Spine domain 20 is connected to the representative node 220 of the MC-LAG in the Leaf domain 22 and transmits the packet to the communication node 220. The packet transmitted to the communication node 220 in the Leaf domain 22 is forwarded along the flooding path in the Leaf domain 22.

The packet of VLAN=10 is transmitted to the external nodes 302 and 303 connected to the communication nodes 222 and 223 in the Leaf domain 22 as necessary.

As described above, according to the present exemplary embodiment, even in a case where a failure occurs in any of the communication nodes constituting a MC-LAG, it is possible to have a packet reach the destination external node by dynamically selecting a representative node and non-representative node and recalculating a flooding path.

The exemplary embodiments of the present invention have been described above, but the present invention is not limited thereto. Specifically, the configuration and operation of the elements and the network shown in each drawing above are examples to facilitate understanding of the present invention and are not limited to the configuration shown in the drawings. For instance, link aggregations may be constituted by a greater number of nodes, or a different algorithm may be used to determine the representative node.

For instance, the present invention may be applied to a control apparatus, communication system, and communication node centrally controlling communication nodes.

Further, the following modes of the present invention are possible.

[Mode 1]

As the control apparatus relating to the first aspect.

[Mode 2]

The control apparatus according to Mode 1, wherein the path generation unit is configured to generate each of the plurality of forwarding paths linked to a VLAN (Virtual Local Area Network).

[Mode 3]

The control apparatus according to Mode 2, wherein
the path generation unit is configured to give each of the plurality of forwarding paths an identifier linked to a VLAN, and
the path determination unit is configured to determine the representative node using the identifier linked to a VLAN given to each forwarding path and an identifier of a communication node included in each domain.

[Mode 4]

The control apparatus according to Mode 3, wherein
the path determination unit is configured to determine the representative node by applying the identifier given to each forwarding path and the identifier of a communication node included in each domain to a predetermined formula.

[Mode 5]

The control apparatus according to any one of Modes 1 to 4, wherein when a failure occurs in a first communication node determined as a representative node, the path determination unit is configured to determine another communication node included in the same domain as the first communication node as a representative node.

[Mode 6]

As the communication system relating to the second aspect.

[Mode 7]

As the control method relating to the third aspect.

[Mode 8]

The control method according to Mode 7, wherein
the control apparatus generates each of the plurality of forwarding paths linked to a VLAN (Virtual Local Area Network).

[Mode 9]

The control method according to Mode 8 including giving each of the plurality of forwarding paths an identifier linked to a VLAN, wherein the control apparatus determines the representative node using the identifier linked to a VLAN given to each forwarding path and an identifier of a communication node included in each domain.

[Mode 10]

The control method according to Mode 9, wherein
the control apparatus determines the representative node by applying the identifier given to each forwarding path and the identifier of a communication node included in each domain to a predetermined formula.

[Mode 11]

The control method according to any one of Modes 7 to 10 including a step of determining a second communication node included in the same domain as a first communication node as a representative node when a failure occurs in the first communication node determined as a representative node.

[Mode 12]

As the program relating to the fourth aspect.

[Mode 13]

The program according to Mode 12 having the computer execute a process of generating each of the plurality of forwarding paths linked to a VLAN (Virtual Local Area Network).

[Mode 14]

The program according to Mode 13 having the computer execute:
a process of giving each of the plurality of forwarding paths an identifier linked to a VLAN; and
a process of determining the representative node using the identifier linked to a VLAN given to each forwarding path and an identifier of a communication node included in each domain.

[Mode 15]

The program according to Mode 14 having the computer execute a process of determining the representative node by applying the identifier given to each forwarding path and the identifier of a communication node included in each domain to a predetermined formula.

[Mode 16]

The program according to any one of Modes 12 to 15 having the computer execute a process of determining a second communication node included in the same domain as a first communication node as a representative node when a failure occurs in the first communication node determined as a representative node.

Further, the disclosure of each Patent Literature and Non-Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications. Particularly, the ranges of the numerical values used in the present description should be interpreted as a numeric value or small range example included in these ranges even in cases where no explanation is provided.

The invention claimed is:

1. A control apparatus, comprising:
a path generation unit configured to logically generate a plurality of forwarding paths for forwarding a broadcast packet between a plurality of domains that each includes a plurality of communication nodes;
a path determination unit configured to determine different communication nodes among the plurality of communication nodes included in each domain as representative nodes that forward the broadcast packet in each of the plurality of forwarding paths; and
a path setting unit configured to set control information including information regarding the representative nodes in the communication nodes on the plurality of forwarding paths.

2. The control apparatus according to claim 1, wherein
the path generation configured to generate each forwarding path linked to a VLAN (Virtual Local Area Network).

3. The control apparatus according to claim 2, wherein the path generation unit is configured to give each forwarding path an identifier linked to the VLAN, and the path determination unit is configured to determine the representative nodes using the identifier linked to the VLAN given to each forwarding path and an identifier of a communication node included in each domain.

4. The control apparatus according to claim 3, wherein the path determination unit is configured to determine the representative nodes by applying the identifier given to each forwarding path and the identifier of the communication node included in each domain to a predetermined formula.

5. The control apparatus according to claim 3, wherein the path determination unit determines the representative nodes by using the identifier of the communication node and an identifier corresponding to logical broadcast packet forwarding path linked to the VLAN for each domain.

6. The control apparatus according to claim 5, wherein the path determination unit determines the representative nodes based on a remainder obtained by dividing the identifier of the communication node by the identifier corresponding to logical broadcast packet forwarding path.

7. The control apparatus according to claim 1, wherein when a failure occurs in a first communication node determined as a first representative node, the path determination unit is configured to determine another communication node included in the same domain as the first communication node as a second representative node.

8. A communication system, comprising:
a plurality of domains that each includes a plurality of communication nodes;
a control apparatus configured to control the plurality of communication nodes; and
the control apparatus comprising:
a path generation unit configured to logically generate a plurality of forwarding paths for forwarding a broadcast packet between the plurality of domains;
a path determination unit configured to determine different communication nodes among the plurality of communication nodes included in each domain as representative nodes that forward the broadcast packet in each of the plurality of forwarding paths; and
a path setting unit configured to set control information including information regarding the representative nodes in the communication nodes on the plurality of forwarding paths.

9. A control method performed in a control apparatus, comprising:
logically generating a plurality of forwarding paths for forwarding a broadcast packet between a plurality of domains that each includes a plurality of communication nodes;
determining different communication nodes among the plurality of communication nodes included in each domain as representative nodes that forward the broadcast packet in each of the plurality of forwarding paths; and
setting control information including information regarding the representative nodes in the communication nodes on the plurality of forwarding paths.

10. The control method according to claim 9, wherein the control apparatus generates each forwarding path linked to a VLAN (Virtual Local Area Network).

11. The control method according to claim 10 including giving each forwarding path an identifier linked to the VLAN, wherein the control apparatus determines the representative nodes using the identifier linked to the VLAN given to each forwarding path and an identifier of a communication node included in each domain.

12. The control method according to claim 11, wherein the control apparatus determines the representative nodes by applying the identifier given to each forwarding path and the identifier of the communication node included in each domain to a predetermined formula.

13. The control method according to claim 9 comprising determining a second communication node included in the same domain as a first communication node as a second representative node when a failure occurs in the first communication node determined as a first representative node.

14. A non-transitory computer-readable recording medium storing a program having a computer execute:
a process of logically generating a plurality of forwarding paths for forwarding a broadcast packet between a plurality of domains that each includes a plurality of communication nodes;
a process of determining different communication nodes among the plurality of communication nodes included in each domain as representative nodes that forward the broadcast packet in each of the plurality of forwarding paths; and
a process of setting control information including information regarding the representative nodes in the communication nodes on the plurality of forwarding paths.

15. The medium according to claim 14 having the computer execute a process of generating each of the plurality of forwarding paths linked to a VLAN (Virtual Local Area Network).

16. The medium according to claim 15 having the computer execute:
a process of giving each of the plurality of forwarding paths an identifier linked to the VLAN; and
a process of determining the representative nodes using the identifier linked to the VLAN given to each forwarding path and an identifier of a communication node included in each domain.

17. The medium according to claim 16 having the computer execute a process of determining the representative node by applying the identifier given to each forwarding path and the identifier of the communication node included in each domain to a predetermined formula.

18. The medium according to claim 14 having the computer execute a process of determining a second communication node included in the same domain as a first communication node as a second representative node when a failure occurs in the first communication node determined as a first representative node.

* * * * *